US009267782B1

(12) United States Patent
Capron et al.

(10) Patent No.: US 9,267,782 B1
(45) Date of Patent: Feb. 23, 2016

(54) GENERATING AN IMAGE USING AN ACTIVE OPTICAL INTERFERENCE SYSTEM

(71) Applicant: The Boeing Company, Chicago, IL (US)

(72) Inventors: Barbara A. Capron, Sammamish, WA (US); Claudio G. Parazzoli, Seattle, WA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 14/043,202

(22) Filed: Oct. 1, 2013

Related U.S. Application Data

(63) Continuation-in-part of application No. 13/689,204, filed on Nov. 29, 2012.

(51) Int. Cl.
*G01B 9/02* (2006.01)
*H04B 10/70* (2013.01)

(52) U.S. Cl.
CPC ........ *G01B 9/02041* (2013.01); *G01B 9/02027* (2013.01); *G01B 9/02028* (2013.01); *H04B 10/70* (2013.01); *G01B 2290/45* (2013.01); *G01B 2290/55* (2013.01)

(58) Field of Classification Search
CPC ........... G01B 9/02041; G01B 9/02027; G01B 9/02028; G01B 2290/45; G01B 2290/55; H04B 10/70
See application file for complete search history.

(56) References Cited

U.S. PATENT DOCUMENTS

| | | | |
|---|---|---|---|
| 6,005,513 A | 12/1999 | Hardesty | |
| 6,882,431 B2 * | 4/2005 | Teich et al. | 356/497 |
| 2004/0100637 A1 * | 5/2004 | Teich et al. | 356/497 |
| 2014/0146323 A1 * | 5/2014 | Capron et al. | 356/450 |

OTHER PUBLICATIONS

Z. Y. Ou, "Enhancement of the phase-measurement sensitivity beyond the standard quantum limit by anonlinear interferometer", published Feb. 14, 2012, Physical Review A 85, 023815 (2012).*
Ford et al., "Helicopter Ship Board Landing System," Proceedings of the 18th International Technical Meeting of the Satellite Division of the Institute of Navigation, Sep. 2005, pp. 1-10.
Rodriguez et al., "Theory and design of interferometric Synthetic Aperture Radars," IEE Proceedings-F, vol. 139, No. 2, Apr. 1992, pp. 147-159.

(Continued)

*Primary Examiner* — Michael A Lyons
*Assistant Examiner* — Violeta A Prieto
(74) *Attorney, Agent, or Firm* — Charles L. Moore; Moore & Van Allen PLLC

(57) ABSTRACT

A system may include a synthetic optical aperture configured to receive a plurality of received photon beams comprising a scene including an object. The system may also include an active optical interference system configured to interfere each of the plurality of received photon beams from the synthetic optical aperture with a corresponding source photon beam of a plurality of source photon beams. The active optical interference system may generate a plurality of enhanced interference beams. Each enhanced interference beam includes at least a predetermined gain. The system may further include a detector system configured to detect the plurality of enhanced interference beams and generate an electrical output signal for use in generating a reconstructed image of the object with improved resolution responsive to at least the predetermined gain of the enhanced interference beams.

22 Claims, 5 Drawing Sheets

(56) References Cited

OTHER PUBLICATIONS

Gottesman et al., "Longer-Baseline Telescopes Using Quantum Repeaters," Physical Review Letters, 109 (7). Art. 070503. ISSN 0031-9007 (doi:10.1103/PhysRevLett.109.070503), pp. 1-10.

Napolitano et al., "Interaction-based quantum metrology showing scaling beyond the Heisenberg limit," Nature, vol. 471, Mar. 24, 2011, pp. 486-489.

Plick et al., "Coherent-light-boosted, sub-shot noise, quantum interferometry," New Journal of Physics 12 (2010) 083014, pp. 1-9.

* cited by examiner

GENERATING AN IMAGE USING AN ACTIVE OPTICAL INTERFERENCE SYSTEM

CROSS-REFERENCE TO RELATED APPLICATIONS

The present application is a continuation-in-part of U.S. patent application Ser. No. 13/689,204, filed Nov. 29, 2012, entitled "Angular Resolution of Images Using Photons Having Non-Classical States" which is assigned to the same assignee as the present application and is incorporated by reference herein in its entirety.

FIELD

The present disclosure relates to generating images, and more particularly to an active optical interference system for generating an image with improved resolution.

BACKGROUND

The use of synthetic apertures is well established in both the radio and optical/infrared regimes but in the optical regime it suffers unique problems due to requirements of directly interfering beams from individual apertures and loss of photons and phase information in the process. Aperture synthesis, a form of interferometry, may include mixing light received through a collection of apertures to produce images that have a same angular resolution as an aperture having the size of the entire collection of apertures. In this manner, the collection of apertures forms a "synthetic aperture". As used herein, the "angular resolution" of an image is the minimum angular distance relative to the synthetic aperture between objects in the image at which those objects can be resolved, or distinguished. The angular resolution of an image may be expressed in radians, degrees, arcminutes, arcseconds, or some other unit of angular measurement.

The angular resolution of an image generated using a synthetic aperture may be determined by the baseline of the synthetic aperture. As used herein, the "baseline" of a synthetic aperture is the maximum physical separation between the apertures that make up the synthetic aperture along a line normal to the direction of the object relative to the synthetic aperture. Increasing the baseline may increase angular resolution.

With some currently available synthetic apertures, photons received through, for example, a pair of apertures in the synthetic aperture may be transported to a same location and physically interfered with each other. The maximum baseline for these types of synthetic apertures may be limited by the potential for the loss of photons and/or phase information along the transmission lines used to transport the photons. These transmission lines may take the form of, but are not limited to, optical fibers, vacuum pipes, and/or other types of transmission lines.

With these types of transmission lines, as the distance that the photons need to travel increases, the potential for the loss of photons and/or phase information also increases. Consequently, the limits to the maximum baseline that can be achieved may limit the angular resolution that can be achieved. For example, some currently available synthetic aperture systems may be unable to produce images having an angular resolution of less than about one nanoradian.

In some cases, the baseline for the synthetic aperture may be increased using quantum teleportation. In particular, quantum teleportation may be used to transfer the state of first photons received through a first aperture to second photons received through a second aperture without physically transporting the first photons to the second photon. Quantum teleportation may be performed using entangled photons from a local source.

Quantum teleportation may allow longer baselines to be achieved when compared to physically interfering the photons received through apertures with each other. However, the maximum baseline that can be achieved may still be constrained by the limited number of entangled photons that can be admitted from the local source during a given time interval.

Further, fluctuations in the number of entangled photons that may be emitted during a given point in time may require more measurements than desired to be generated to produce an image. Additionally, these fluctuations may increase the minimum brightness of an object that can be imaged more than desired. Therefore, it would be desirable to have a method and apparatus that takes into account at least some of the issues discussed above, as well as other possible issues.

SUMMARY

In accordance with an embodiment, a system may include a synthetic optical aperture configured to receive a plurality of received photon beams comprising a scene including an object. The system may also include an active optical interference system configured to interfere each of the plurality of received photon beams from the synthetic optical aperture with a corresponding source photon beam of a plurality of source photon beams. The active optical interference system may generate a plurality of enhanced interference beams. Each enhanced interference beam includes at least a predetermined gain. The system may further include a detector system configured to detect the plurality of enhanced interference beams and generate an electrical output signal for use in generating a reconstructed image of the object with improved resolution responsive to at least the predetermined gain of the enhanced interference beams.

In accordance with another embodiment, a system may include a photon source configured to emit source photons having a non-classical state. The source photons may be configured to be distributed as a plurality of source photon beams in which fluctuations in a number of photons of each of the plurality of source photon beams is reduced to within a predetermined tolerance. The system may additionally include a sensor system configured to receive a plurality of photon beams comprising a scene including an object. The sensor system may include an active interference system that interferes each of the plurality of photon beams with a corresponding source photon beam of the plurality of source photon beams to form a plurality of enhanced interference beams and generates an output signal based on the plurality of enhanced interference beams. The output signal may be configured for use in generating an image of the object.

In accordance with further embodiment, a method may include receiving a plurality of photon beams. The plurality of photon beams may include a scene containing an object. The method may also include interfering each of the plurality of photon beams with a corresponding source photon beam of a plurality of source photon beams in an active optical interference system to form a plurality of enhanced interference beams. Each of the plurality of enhanced interference beams may include at least a predetermined gain and phase variance. The method may also include forming an output signal based on the plurality of enhanced interference beams. The output signal may be configured for use in generating an image of the scene.

The features and functions can be achieved independently in various embodiments of the present disclosure or may be combined in yet other embodiments in which further details can be seen with reference to the following description and drawings.

BRIEF DESCRIPTION OF THE SEVERAL VIEWS OF DRAWINGS

The novel features believed characteristic of the illustrative embodiments are set forth in the appended claims. The illustrative embodiments, however, as well as a preferred mode of use, further objectives and further features thereof, will best be understood by reference to the following detailed description of illustrative embodiments of the present disclosure when read in conjunction with the accompanying drawings.

DETAILED DESCRIPTION

Figure 1:
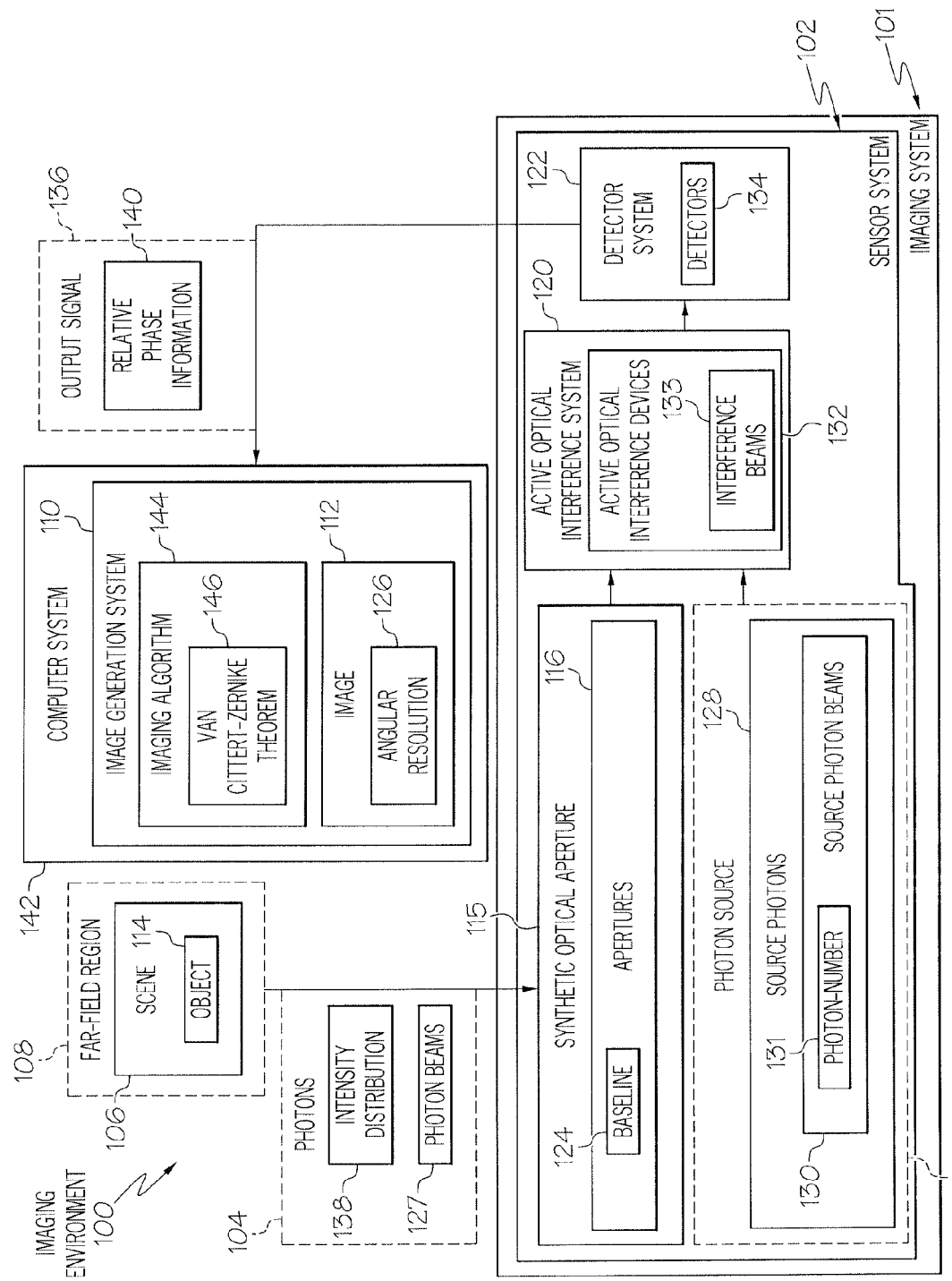
FIG. 1 is a block schematic diagram of an example of a system for generating an image of an object with improved resolution in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The illustrative embodiments recognize and take into account different considerations. For example, the illustrative embodiments recognize and take into account that it may be desirable to have a synthetic aperture with a baseline sufficiently long to allow an image to be constructed having a desired angular resolution. The desired angular resolution made be, for example, without limitation, an angular distance relative to the synthetic aperture that is less than about one nanoradian.

FIG. 1 is a block schematic diagram of an example of a system for generating an image of an object with improved resolution in accordance with an embodiment of the present disclosure. FIG. 1 illustrates an example of an imaging environment 100 in the form of a block diagram. The imaging environment 100 may include an imaging system 101. The imaging system 101 may be used to generate images of a scene 106. As depicted, the imaging system 101 may include a sensor system 102, an image generator 110, and a photon source 118.

The sensor system 102 may be configured to measure the photons 104 originating from the scene 106. The image generator 110 may be configured to generate an image 112 of the scene 106 using the measurements of the photons 104 formed by the sensor system 102.

For example, the image generator 110 may be configured to generate an image 112 and object 114 in the scene 106. In one illustrative example, the scene 106 is located in a far-field region 108 with respect to the sensor system 102. In this illustrative example, the object 114 may be referred to as a distant object. The photons 104 received at the sensor system 102 may be, for example, photons emanating from the object 114.

As depicted, the sensor system 102 may include a synthetic optical aperture 115, an active interference system 120, and a detector system 122. In some cases, the photon source 118 in the imaging system 101 may be considered part of the sensor system 102. However, in other illustrative examples, the photon source 118 may be considered separate from the sensor system 102. The photon source 118 may be referred to as a local photon source.

The synthetic optical aperture 115 in the sensor system 102 may be formed by a plurality of optical apertures 116 that are configured to receive the photons 104 from the scene 106. As used herein, an "aperture" such as one of the optical apertures 116 that form the synthetic optical aperture 115, is an opening or space through which light is allowed to pass. An example of a synthetic optical aperture 115 will be described in more detail with reference to FIG. 2.

In one illustrative example, each of the optical apertures 116 may belong to a different optical system. These optical systems may take the form of, for example, without limitation, optical telescopes, optical receiver systems, and/or other types of optical systems. In other illustrative examples, two or more of the optical apertures 116 may belong to the same optical system.

The maximum physical separation between the optical apertures 116 is the baseline 124 of the apertures 116. The baseline 124 may determine the separation between the near-field region and the far-field region 108 with respect to the sensor system 102. For example, the far-field region 108 may be greater than about twice the baseline 124 squared over the wavelength of the photons 104 from the scene 106. The near-field region may be less than about twice a baseline 124 squared over the wavelength of the photons 104 from the scene 106.

Further, the baseline 124 of the apertures 116 determines the angular resolution 126 of the image 112 that is produced by the image generator 110. Angular resolution 126 may be the minimum angular distance relative to the synthetic optical aperture 115 between distinguishable objects in the image 112. Angular resolution 126 may be expressed in, for sample, without limitation, radians, arcseconds, or some other type of unit of angular measurement. The smaller the angle of the angular resolution 126, the better the angular resolution 126.

The relationship between the angular resolution 126 of the image 112 and the baseline 124 may be given as follows:

$$R = \lambda/B$$

where R is the angle of the angular resolution 126 expressed in radians, $\lambda$ is the wavelength of the photons 104, and B is the baseline 124 of the apertures 116. The wavelength, $\lambda$, and the baseline 124, B, may be expressed in the same units.

Increasing the baseline 124 of the optical apertures 116 decreases the angle of the angular resolution 126, thereby improving the angular resolution 126. In these illustrative examples, the sensor system 102 is configured to increase the baseline 124 of the optical apertures 116 such that the angular resolution 126 of the image 112 may be improved.

As depicted, the photons 104 originating from the scene 106 may be received through the optical apertures 116 in the form of a plurality of photon beams 127. Each of these photon beams 127 may be comprised of one or more photons that emanate from, for example, without limitation, the object 114 in the scene 106. In particular, each of the photon beams 127 may pass through a corresponding one of the optical apertures 116.

The photon-number of each of these photon beams 127 may fluctuate more than desired. As used herein, the "photon-number" of a photon beam may be the number of photons in that beam that encounter a particular two-dimensional area at a given point in time. In some cases, the photon-number of a photon beam may be considered the mean number of photons in the beam that encountered the two-dimensional area during a given time interval. In these cases, the photon-number may be referred to as a mean photon-number.

Fluctuations in the photon-number of each of the photon beams 127 may be statistically described as the variance in the photon-number. When the variance in the photon-number is outside of selected tolerances, the number of measurements that need to be taken by the sensor system 102 in order to form the image 112 of the scene 106 may be greater than desired. Further, when the variance is outside of selected tolerances, the number of photons from the object 114 that are needed in order to reconstruct the image 112 of the object 114 may be increased. Consequently, the dimness of the object 114 may limit the ability to reconstruct the image 112 of the object 114.

However, interference of the photon beams 127 received through the optical apertures 116 with other photon beams having an increased number of photons and reduce fluctuations in photon-number may improve the overall statistics of the photon beam 127. In these illustrative examples, the photon source 118 in the sensor system 102 is configured to emit source photons 128 which may be interfered with the photons 104 and the photon beam 127.

In one illustrative example, the photon source 118 may be positioned at a center of the synthetic optical aperture 115. Of course, in other illustrative examples, the photon source 118 may be positioned at an edge of the synthetic optical aperture 115. In some cases, the photon source 118 may be separate from the sensor system 102 but may be positioned at a center of the sensor system 102.

Photon source 118 may emit source photons 128 having a non-classical state. When the source photons 128 have a wavelength within the visible range, infrared range, near-infrared range, ultraviolet range, or some other light range, the source photons 128 may take the form of non-classical light. As used herein, photons having a "non-classical state" may be photons that exhibit quantum noise. Further, a non-classical state for photons may be described as any state in which a density matrix of the photons does not match a probability density function. The non-classical state may be, for example, without limitation, an entangled state, a squeezed state or some other type of non-classical state.

The number of source photons 128 emitted by the photon source 118 may be sufficiently high to consider the photon source 118 a strong bright source. In other words, the photon-number 131 of each of the source photons beams 130 that are formed from the source photons 128 may be higher than some selected threshold. As one illustrative example, the photon-number 131 may be greater than about 1,000 photons. In some cases, the photon-number 131 may be greater than about 10,000 photons.

The source photons 128 emitted by the photon source 118 may be distributed in the form of a plurality of source photons beams 130. This distribution may be performed in a number of different ways. In an illustrative example, the photon source 118 may be a device comprised of a plurality of laser heads, each configured to emit a different source photon beam. And another illustrative example, the source photons 128 emitted by the photon source 118 may be split into the source photon beams 130 by one or more beam splitters.

In these illustrative examples, the source photon beams 130 are mutually coherent, that is, the source photon beams 130 either have the same optical phase or a known optical phase difference from one to the other, if the phase differences are known. Generally, to have the same optical phase the source photon beams 130 need to come from the same beam or photon source 118. In one illustrative example, the relative phase between the source photon beams 130 may be substantially zero.

For example, in some cases, the photon source 118 may be of a coherent source. A coherent source may be a device that emits photon beams having the same frequency, wavelength and phase. In other words, the photon beams emitted by the coherent source may be "phase-locked." When the photon source 118 is a coherent source, the relative phase between the source photon beams 130 may be substantially zero.

Additionally, photon source 118 may be configured to reduce fluctuations in photon-number 131 of the source photon beams 130 to within selected tolerances. For example, the photon source 118 emits the source photons 128 having a squeezed state, the squeezed state of the source photons 128 may allow the statistics with respect to the photon-number 131 of the source photon beams 130 formed by the source photons 128 to be controlled within selected ranges. For example, the photon source 118 may be configured such that the statistical variance in the photon-number 131 of each of the source photon beams 130 formed by the photon source photons 128 over time is reduced to within selected tolerances.

Each of the photon beams 127 received through the synthetic optical aperture 115 may be interfered with a corresponding source photon beam of the source photon beams 130 to form a plurality of enhanced interference beams 133. The interference of the photon beams 127 with the corresponding source photon beams 130 may be performed using the active or nonlinear optical interference system 120 in the sensor system 102. The active optical interference system 120 may include a plurality of active or nonlinear optical interference devices 132. An example of an active on nonlinear optical interference device that may be used for the active optical interference device 132 will be described in more detail with reference to FIG. 4. As described in more detail herein, the active optical interference system 120 may generate a plurality of enhanced interference beams 133 that may include at least a predetermined gain and reduced or minimal phase variance between the enhanced interference beams 133 which can produce an image 112 of the scene 106 with significantly improved angular resolution 126. In one illustrative embodiment, the active optical interference devices 132 may include optical parametric amplifiers to generate the enhanced interference beams 133 with increased gain and minimal phase variance. Mixing or interfering the photon beams 127 or target photon beams from the scene 106 with the locally controlled source photon beams 130 allows a reduction in the phase variance which is enhanced by the active optical interference system 120 which may also be referred to as an active interferometer. This allows more accurately measured phases by the sensor system 102 and therefore superior or improved reconstructed images by the image generation system 110. The active optical interference system 120 combines classical and non-classical photon beams for phase measurements.

Interfering the source photons beams 130 emitted by the photon source 118 with the photon beams 127 received through the optical apertures 116 may improve the statistical variance and the photon-number of each of the photon beams 127 from the scene 106. In other words, the source photons beams 130 may be used to strengthen or enhance the photon beams 127 received by the optical apertures 116.

Additionally, interference of the photon beams 127 with the source photons beams 130 having the reduced fluctuations in photon-number 131 may cause a reduction in the relative phase between the photon beams 127 and the source photons beams 130. In particular, the relative phase between one of the photon beams 127 and a corresponding one of the source photons beams 130 interfered with that photon beam may be reduced in response to the reduced fluctuations in the photon-number 131 of the corresponding source photons beam.

In this manner, the accuracy of the phase information identified using the enhanced interference beams 133 may be increased. Further, the phase information identified using the enhanced interference beams 133 may have a desired level of accuracy even when the photon beams 127 each only contain a minimal number of photons, such as for example, only about one to five photons.

This increase in level accuracy that may be achieved when identifying phase information from the enhanced interference beams 133 may reduce the number of measurements that need to be taken by the sensor system 102 to generate the image 112 having a desired angular resolution 126. Further, the usage of the source photons beams 130 allows images of dimmer objects in the scene 106 to be reconstructed.

Additionally, using the source photons beams 130 to strengthen the photon beams 127 received through the optical apertures 116 allows the baseline 124 of the optical apertures 116 to be increased and thereby, the angular resolution 126 of the image 112 may be improved. The baseline 124 of the optical apertures 116 may be increased to over, for example, without limitation, in a range of about 0.1 kilometers, 10 kilometers, 100 kilometers, or some other sufficiently long distance.

Figure 2:
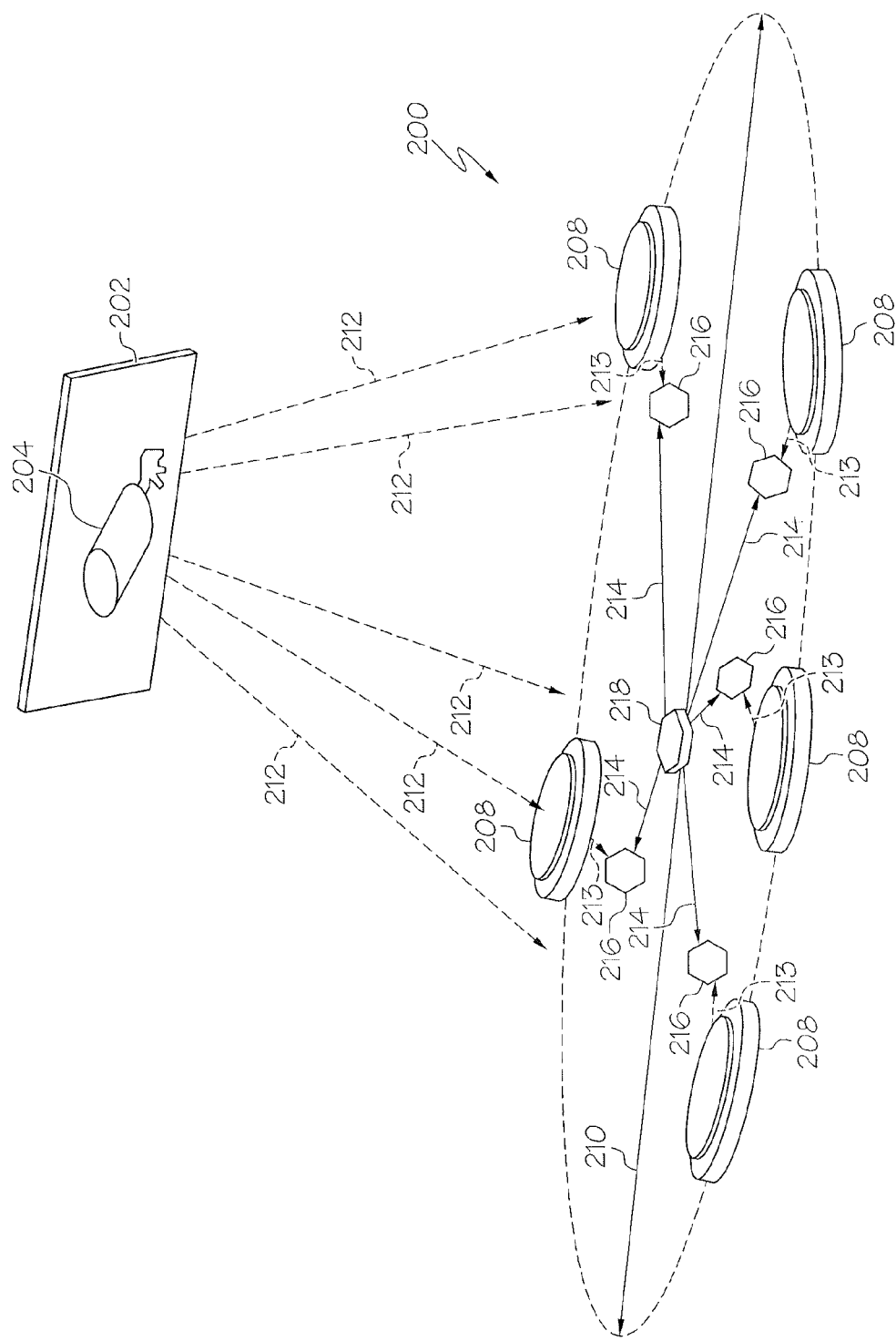
FIG. 2 is a perspective view of an example of a synthetic optical aperture for reconstructing an image of an object in accordance with an embodiment of the present disclosure.

As one illustrative example, each of the active optical interference devices 132 in the optical interference system 120 may be positioned near a corresponding one of the optical apertures 116, similar to that illustrated in FIG. 2. Each of the source photons beams 130 may be transported to the corresponding one of the active optical interference devices 132 such that the source photons beam 130 may be interfered with the corresponding photon beam 127. The intensity or photon-number of the source photons beams 130 may be sufficiently high such that any photon loss during the transporting of the photons in the source photon beam 130 to the active optical interference devices 132 may be within selected tolerances.

In this manner, the photon beams 127 received through the optical apertures 116 do not need to be transported over longer distances to reach the active optical interference devices 132 in the active optical interference system 120. Instead the source photon beams 130 may be transported over longer distances.

The enhanced interference beams 133 formed by interfering the source photon beams 130 with the photon beams 127 received through the optical apertures 116 may be detected by the detector system 122. The detector system 122 may include a plurality of detectors 134. These detectors 134 may convert the light in the enhanced interference beams 133 into electrical signals. In particular, the electrical signals may be for example, current signals, which may also be referred to as photocurrent signals. These current signals may be used to form an output signal 136.

The output signal 136 formed by the detector system 122 may be a transformation of the intensity distribution 138 of the photons 104 from the scene 106. In particular, the output signal 136 may be a Fourier transform of the intensity distribution 138 of the photons 104 from the scene 106.

Further, the output signal 136 may contain relative phase information 140 for the photon beams 127 received through the optical apertures 116. In one illustrative example, the relative phase information 140 identifies the overall variation in phase between the photon beams 127 received through the optical apertures 116.

The image generator 110 is configured to receive and process the output signal 136 to form the image 112 of the scene 106. For example, the image generator 110 may sample the output signal 136 to identify measurements of the photons 104 received at the sensor system 102. The image generator 110 may use these measurements and an imaging algorithm 144 to identify the intensity distribution 138 of the photons 104 from the scene 106 to form the image 112. The imaging algorithm 144 may be based on, for example, without limitation, the Van Cittert-Zernike theorem (VCZT) 146. Details regarding the VCZT are discussed in Rodriguez, E.; Martin, J. M., "Theory and design of interferometric synthetic aperture radars," *Radar and Signal Processing, IEE Proceedings-F*, vol. 139, no. 2, pp. 147-159, April 1992, submitted herewith and is incorporated by reference herein in its entirety.

The image 112 constructed by the image generator 110 based on the output signal 136 received from the detector system 122 may have an angular resolution 126 within the desired range. As one illustrative example, the angular resolution 126 of the image 112 may be an angle that is less than about one nanoradian.

In these illustrative examples, the image generator 110 may be implemented using hardware, software, or a combination of the two. In one illustrative example, the image generator 110 may be implemented in a computer system 142.

This computer system 142 may be implemented using one or more computers. When more than one computer is present and a computer system 142, these computers may be in communication with one another. A computer and a computer system 142 may be implemented using a data processing system.

In other illustrative examples, the image generator 110 may be implemented using a processor unit, an integrated circuit, microchip, or other type of processing hardware. As depicted in these examples, the image generator 110 may be separate from the sensor system 102. However in other illustrative examples, the image generator 110 to be part of the sensor system 102.

FIG. 2 is a perspective view of an example of a synthetic optical aperture 200 for reconstructing an image of a scene 202 including an object 204 in accordance with an embodiment of the present disclosure. The synthetic optical aperture 200 may be used for the synthetic optical aperture 115 in FIG. 1. Similar to that previously described, the synthetic optical aperture 200 may include a plurality of optical apertures 208. The optical apertures 208 may be distributed in a predetermined pattern to define the synthetic optical aperture 200 with an effective aperture 210 that is significantly larger than an aperture of each of the smaller optical apertures 208. The optical apertures 208 may each receive a photon beam 212 comprising the scene 202 including the object 204. The photon beam 212 received by each optical aperture 208 may be directed as a received beam 213 or output beam to a respective one of a plurality of active or nonlinear optical devices 216. The received or output photon beam 213 from each optical aperture 208 may be mixed or interfered with a corresponding source photon beam 214 of a plurality of coherent source photon beams in the respective one of the plurality of active or nonlinear optical device 216 similar to that previously described. The plurality of nonlinear optical devices 216 may define an active optical interference system similar to active optical interference system 120 in FIG. 1. The plurality of source photon beams 214 may be generated by a controllable photon source 218 that may be referred to as a local source. The controllable photon source 218 may be controlled to generate a predetermined number of photons of a selected state in each source photon beam 214. The selected state of the source photons may be a non-classical state. The predetermined number of photons or photon-number in each source photon beam 214 may be sufficiently high so as to consider the photon source 218 a strong bright source. The photon source 218 may be a high intensity laser or other light source capable of generating photon beams with a sufficiently high number of photons to provide the enhanced interference beams described herein for providing images with significantly improved angular resolution. As previously discussed, the plurality of source photon beams 214 are each mutually coherent and have the same optical phase or a known optical phase difference from one to the other, if the phased differences are known.

Figure 3:
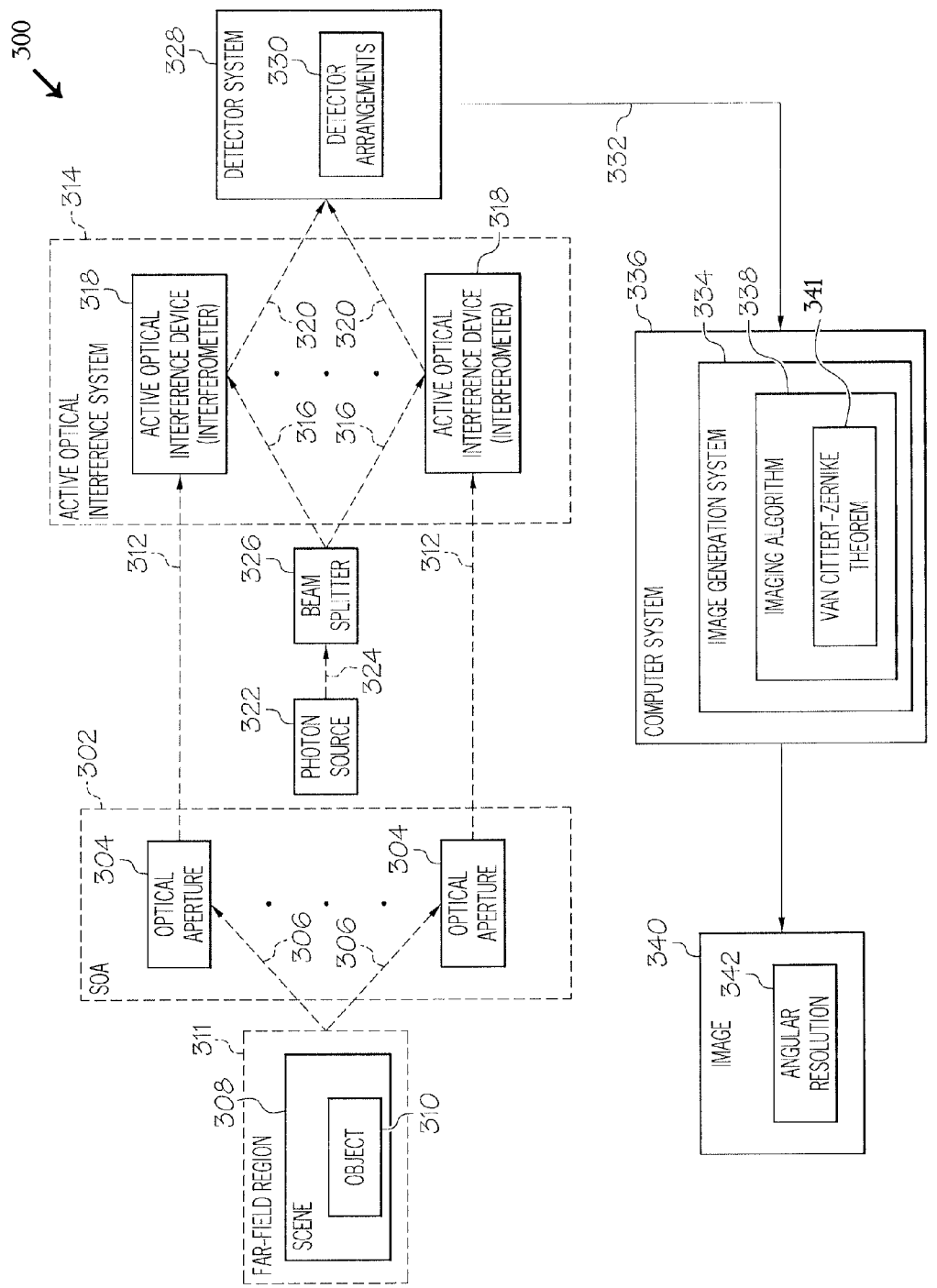
FIG. 3 is a block schematic diagram of an example of a system for generating an image of an object with improved resolution in accordance with another embodiment of the present disclosure.

FIG. 3 is a block schematic diagram of an example of a system 300 for generating an image of an object 310 with improved resolution in accordance with another embodiment of the present disclosure. The system of 300 may be part of or may be used for the imaging system 101 in FIG. 1. The system 300 may include a synthetic optical aperture (SOA) 302. The synthetic optical aperture 302 may include a plurality of optical apertures 304 distributed in a predetermined pattern, similar to that previously described, to define the synthetic optical aperture 302. Each of the optical apertures 304 may be configured to receive a photon beam 306 of a scene 308 including the object 310. Similar to that previously described, the scene 308 may be located in a far-field region 311 with respect to the system 300.

The photon beam 306 received by each optical aperture 304 may be transmitted as a received photon beam 312 to an active or nonlinear optical interference system 314. The active optical interference system 314 may be configured to interfere each of the plurality of received photon beams 312 with a corresponding source photon beam 316 of a plurality of source photon beams. The active optical interference system 314 may include a plurality of active or nonlinear optical interference devices 318. The active optical interference device 318 may define an active or nonlinear interferometer. An example of an active optical interference device or interferometer that may be used for the active optical interference device 318 will be described in more detail with reference to FIG. 4. Each active optical interference device 318 may generate an enhanced interference beam 320 by interfering the received photon beam 312 with the corresponding source photon beam 316. The active or nonlinear optical interference device 318 may be defined as being active or nonlinear in that the device 318 may include active components, such as for example but not necessarily limited to optical parametric amplifiers or similar components that can generate an output signal with increased gain and reduced phase shift or phase variance between the enhanced output interference beams 320 for improved resolution of a reconstructed image of the scene 308 responsive to the increased gain and reduced phase shift compared to the received photon beams 312 as described herein. The active interference system 314 may be configured to measure a relative phase between the received photon beam 312 and the corresponding source photon beam 316.

The system 300 may include a photon source 322 configured to emit a photon beam 324 comprising a known number of source photons. The photon source 322 may be controlled to generate the photon beam 324 with a selected number of photons that are significantly more than the number of photons in the received photon beams 312. The system 300 may also include a beam splitter 326 configured to split the photon beam 324 from the photon source 322 into the plurality of coherent source photon beams 316. Each of the plurality of source photon beams 316 will include a predetermined number of photons that is substantially more photons than the received photon beam 312 with which the source photon beam 316 is interfered. The photon source 322 may be one of a classical coherent photon source or a non-classical photon source. The non-classical photon source may generate photons having a non-classical state as previously described.

The system 300 may also include a detector system 328 configured to detect the plurality of enhanced interference beams 320 and generate an electrical output signal 332. The electrical output signal 332 may be configured for use in generating a reconstructed image 340 of the scene 308 with improved resolution 342. The improved resolution 342 may be responsive to at least the predetermined gain of the enhanced interference beams 320 and minimal phase variance between the enhanced interference beams 320. The detector system 328 may include a plurality of detectors 330. One or more detectors or detector arrangements 330 may be associated with each active optical interference device 318. An example of a detector arrangement that may be used for the detector arrangement 330 will be described with reference to FIG. 4. Electrical signals from each of the plurality of detectors 330 may be combined similar to that described herein for generating the image of the scene 308. An example of a detector system that may be used for the detector system 328 will be described in more detail with reference to FIG. 4. In another exemplary embodiment, the detector system 328 may be part of the active optical interference system 314 or may be a separate system similar to the exemplary embodiment illustrated in FIG. 3.

The electrical signal or signals 332 may be received by an image generation system 334 that may be embodied on a computer system 336. The image generation system 334 may include an imaging algorithm 338. The imaging algorithm may be based on the Van Cittert-Zernike theorem 341. The imaging algorithm 338 may generate the reconstructed image 340 of the scene 308 with improved angular resolution 342.

Figure 4:
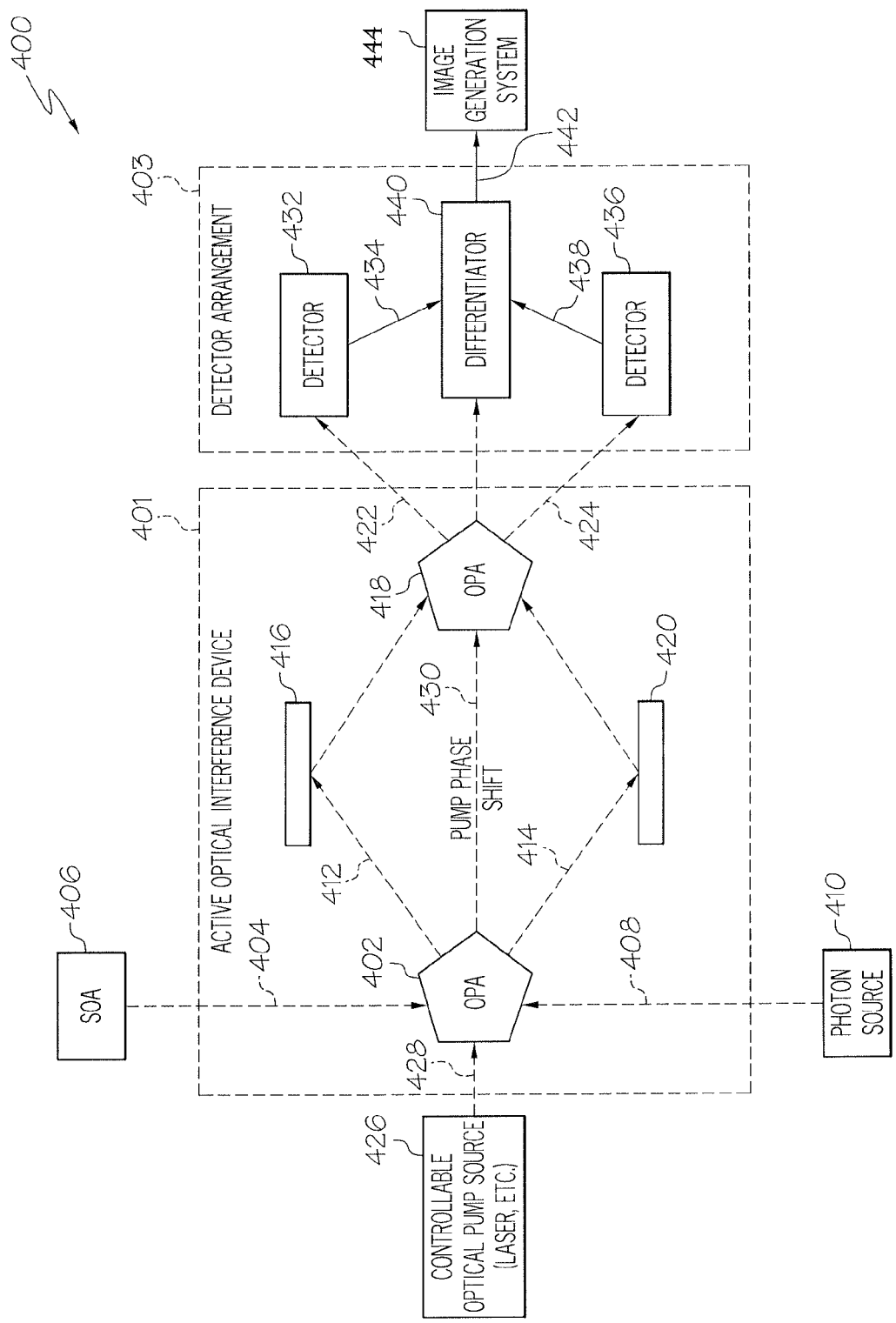
FIG. 4 is a block schematic diagram of an example of a sensor system including an active optical interference device and a detector arrangement in accordance with an embodiment of the present disclosure.

FIG. 4 is a block schematic diagram of an example of a sensor system 400 including an active optical interference device 401 and a detector arrangement 403 in accordance with an embodiment of the present disclosure. The active optical interference device 401 may be used for each of the active optical interference devices 318 in FIG. 3 and devices 132 in FIG. 1. The active optical interference device 401 may include a first optical amplifier 402. The first optical amplifier 402 may be an optical parametric amplifier (OPA) or a similar active or nonlinear device. The first optical amplifier 402 may be configured to receive at least one of the plurality of received photon beams 404 from one of a plurality of optical apertures of the synthetic optical aperture 406 and a corresponding source photon beam 408 from a photon source 410 similar to that previously described. The corresponding source photon beam 408 may be coherent with other corresponding source photon beams generated by the photon source 410 directed to other active optical interference devices 401 of an active optical interference system similar to system 314 of FIG. 3. The first optical amplifier 402 may generate at least a first interference beam 412 and a second interference beam 414. The first interference beam 412 and the second interference beam 414 are generated responsive to interfering the received photon beam 404 with the corresponding source photon beam 408 and splitting the interfered beam into the first interference beam 412 and the second interference beam 414. The first interference beam and the second interference beam 414 may also each include a predetermined gain based on a number of photons in a pump photon beam 428 pumped into the first optical amplifier 402 from a controllable optical pump source 426. The controllable optical pump source 426 may be laser or other high intensity optical pump source.

A first mirror 416 reflects the first interference beam 412 from the first optical amplifier 402 to a second optical amplifier 418. The second optical amplifier 418 may also be an optical parametric amplifier (OPA) or a similar active or nonlinear device. A second mirror 420 reflects the second interference beam 414 from the first optical amplifier 402 to the second optical amplifier 418. The second optical amplifier 418 may be configured to combine at least the first interference beam 412 and the second interference beam 418 and generates at least a first enhanced interference beam 422 and a second enhanced interference beam 424.

As previously discussed, the active optical interference device 401 may also include a controllable optical pump source 426. The controllable optical pump source 426 may be controlled to pump a chosen number of photons in a pump photon beam 428 into the first optical amplifier 402. A total number of photons at an output of the active optical interference device 401 correspond to the chosen number of photons pumped into the first optical amplifier 402 and a pump phase shift of a pumped output photon beam 430 from the first optical amplifier 402 to the second optical amplifier 418. The phase shift in the pumped output photon beam 430 determines an amount of gain in the second optical amplifier 418. Accordingly, the controllable optical pump 426 may be controlled, for example, by computer system 336 (FIG. 3), to generate the pumped output photon beam 430 having a phase shift of pi that provides a maximum gain in the second optical amplifier 418.

The detector arrangement 403 may be associated with the active optical interference device 401 or in another embodiment may be part of the active optical interference device 401. The detector arrangement 403 may include a first detector 432 configured to receive the first enhanced interference beam 422 from the second optical amplifier 418 and to generate a first electrical signal 434 corresponding to the first enhanced interference beam 422. The detector arrangement 403 may also include a second detector 436 configured to receive the second enhanced interference beam 424 from the second optical amplifier 418 and to generate a second electrical signal 438 corresponding to the second enhanced interference beam 424. The first electrical signal 434 and the second electrical signal 438 are combinable with first and second electrical signals from other active optical interference devices of the plurality of active optical interference devices, each similar to active optical interference device 401, for use in generating the reconstructed image of the object.

The detector arrangement 403 may also include a differentiator 440 configured to receive at least the first electrical signal 434 and the second electrical signal 438 and to generate an output signal 442 useable in generating the reconstructed image of the object by an image generation system 444. The detector arrangement 403 may be used for the detector arrangement 330 of FIG. 3. The output signal 442 may be combined with output signals from a plurality of other similar detector arrangements of a detector system, such as detector system 328 (FIG. 3), by the image generation system 444 to reconstruct the image of the object. The image generation system 444 may be similar to the image generation system 110 described with reference to FIG. 1 or image generation system 334 described with reference to FIG. 3. The differentiator 440 may also receive an output pump signal 446 from the second optical amplifier 418 that may be used by the differentiator 440 to process the electrical signals for improved resolution of the reconstructed image.

In summary, the active or nonlinear interference device 401 or interferometer uses nonlinear elements, such as optical parametric amplifiers (OPA) to split and recombine a respective one of a plurality of received photon beams 404 of a scene including an image interfered with a corresponding one of a plurality of source photon beams 408. As a result, the interference fringe amplitudes of the enhanced interference photon beams have a nonlinear dependence on an intensity or photon-number of the optical field for phase sensing and leads to an enhanced phase signal. The total number of photons at an output of the active or nonlinear interference device 401 depends on a pump strength and the pump phase shift between the first optical amplifiers 402 and the second optical amplifier 418. The phase shift determines whether there is a gain or loss in the second optical amplifier 418. For maximum gain, the phase shift between the first optical amplifier 402 and the second optical amplifier 418 may be pi.

Figure 5:
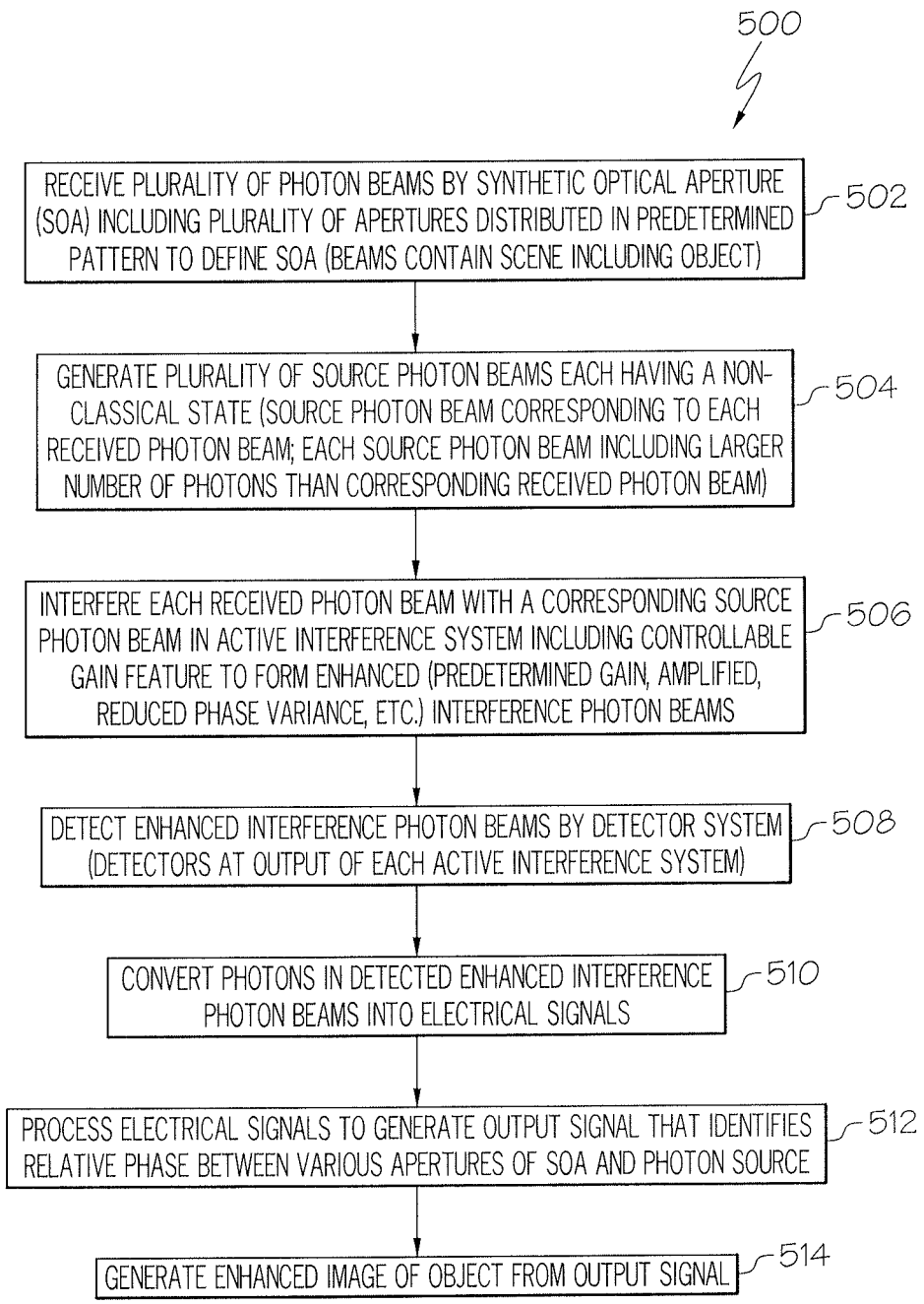
FIG. 5 is a flow chart of an example of a method for generating an image of an object in accordance with an embodiment of the present disclosure.

FIG. 5 is a flow chart of an example of a method 500 for generating an image of an object in accordance with an embodiment of the present disclosure. The method 500 may be performed by the imaging system 101 of FIG. 1 or the system 300 of FIG. 3.

In block 502, a plurality of photon beams may be received by a synthetic optical aperture. The synthetic optical aperture may include a plurality of optical apertures distributed in a predetermined pattern to define the synthetic optical aperture similar to that described with respect to the synthetic optical aperture 200 of FIG. 2. The received photon beams may contain a scene including an object.

In block 504, a plurality of source photon beams may be generated. Each source photon beam may include photons having a non-classical state. Each source photon beam may correspond to each received photon beam. Each source photon beam may include a larger number of photons than the corresponding received photon beam.

In block 506, each received photon beam may be interfered with a corresponding source photon beam of a plurality of source photon beams in an active interference system. The plurality of source photon beams may be mutually coherent, as previously described, that is, each of the plurality of source photon beams either have the same optical phase or a known optical phase difference from one another, if the phase difference is known. The active interference system may be similar to one of the active interference systems previously described. The active interference system may include a controllable gain feature to form enhanced interference photon beams similar to that previously described. The controllable gain feature may include active or nonlinear components, such as optical amplifiers that may be pumped by a controllable optical pump source to control the gain of the active interference system and phase variance between interference optical signals generated by the active interference system. The enhanced interference photon beams may be enhanced by features including but not necessarily limited to a predetermined gain, amplification, reduced phase variance or other characteristics that may provide a reconstructed image of the scene including the object with improved resolution or angular resolution.

In block 508, the enhanced interference photon beams may be detected by a detector system similar to that previously described. Detectors or a detector arrangement may be associated with the output of each active interference system or device similar to that described with respect to the system 400 of FIG. 4.

In block 510, photons in the detected enhanced interference photon beams from each active optical interference device may be converted into electrical signals. In block 512, the electrical signals from the detector devices associated with each of the active optical interference devices may be processed to generate an output signal that identifies relative phase between various apertures of the synthetic optical aperture and the photon source.

In block 514, an enhanced image of the object may be generated from the output signal that has improved angular resolution responsive to the gain and minimal phased variance from interfering the received photon beams and corresponding source photon beams and the active optical interference.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A system, comprising:
   a synthetic optical aperture configured to receive a plurality of received photon beams comprising a scene including an object;
   an active optical interference system configured to interfere each of the plurality of received photon beams from the synthetic optical aperture with a corresponding source photon beam of a plurality of source photon beams, the active optical interference system generating a plurality of enhanced interference beams, each enhanced interference beam comprising at least a predetermined increase in gain; and
   a detector system configured to detect the plurality of enhanced interference beams and generate an electrical output signal for use in generating a reconstructed image of the object with improved resolution responsive to at least the predetermined increase in gain of the enhanced interference beams.

2. The system of claim 1, wherein the active optical interference system comprises a plurality of active optical interference devices, each active optical interference device comprising:
   a first optical amplifier, the first optical amplifier configured to receive at least one of the plurality of received photon beams and the corresponding source photon beam, the first optical amplifier generating at least a first interference beam and a second interference beam; and
   a second optical amplifier, the second optical amplifier configured to combine at least the first interference beam and the second interference beam and generate at least a first enhanced interference beam and a second enhanced interference beam;
   the detector system comprising:
   a first detector configured to receive the first enhanced interference beam and to generate a first electrical signal corresponding to the first enhanced interference beam; and
   a second detector configured to receive the second enhanced interference beam and generate a second electrical signal corresponding to the second enhanced interference beam, the first electrical signal and the second electrical signal are combinable with first and second electrical signals from other active optical interference devices of the plurality of active optical interference devices for use in generating the reconstructed image of the object.

3. The system of claim 2, further comprising a controllable optical pump that is controlled to pump a chosen number of photons in a pump photon beam into the first optical amplifier, a total number of photons at an output of the active optical interference device corresponds to the chosen number of photons pumped into the first optical amplifier and a phase shift of a pumped output photon beam from the first optical amplifier determines an amount of gain in the second optical amplifier.

4. The system of claim 3, wherein the controllable optical pump is controlled to generate the pumped output photon beam comprising a phase shift of pi which provides a maximum gain in the active optical interference device.

5. The system of claim 2, further comprising a differentiator configured to receive at least the first electrical signal and the second electrical signal and to generate an output signal useable in generating the reconstructed image of the object.

6. The system of claim 2, wherein each active optical interference device further comprises:
   a first mirror to reflect the first interference beam from the first optical amplifier to the second optical amplifier; and
   a second mirror to reflect the second interference beam from the first optical amplifier to the second optical amplifier.

7. The system of claim 1, further comprising:
   a photon source configured to emit a photon beam comprising a known number of source photons; and
   a beam splitter configured to split the photon beam from the photon source into the plurality of source photon beams, wherein the active optical interference system comprises a plurality of active optical interference devices, one source photon beam is directed by the beam splitter to a respective one of the plurality of active optical interference devices.

8. The system of claim 7, wherein the photon source comprises one of a classical coherent photon source and a non-classical photon source.

9. The system of claim 7, wherein the corresponding source photon beam comprises a predetermined number of photons that is larger than the number of photons of the received photon beam with which the corresponding source photon beam is interfered.

10. The system of claim 1, wherein the synthetic optical aperture comprises a plurality of optical apertures distributed in a predetermined pattern.

11. The system of claim 10, wherein the active interference system is configured to measure a relative phase between the received photon beam received by each optical aperture of the plurality of optical apertures of the synthetic optical aperture and the corresponding source photon beam.

12. A system, comprising:
a photon source configured to emit source photons having a non-classical state, wherein the source photons are configured to be distributed as a plurality of source photon beams in which fluctuations in a number of photons of each of the plurality of source photon beams is reduced to within a predetermined tolerance; and
a sensor system configured to receive a plurality of photon beams comprising a scene including an object through a synthetic optical aperture, the sensor system comprising an active interference system that interferes each of the plurality of photon beams from the synthetic optical aperture with a corresponding source photon beam of the plurality of source photon beams to form a plurality of enhanced interference beams and generates an output signal based on the plurality of enhanced interference beams, wherein the output signal is configured for use in generating an image of the scene.

13. The system of claim 12, wherein the photon source is configured to control the number of photons in each of the plurality of source photon beams and the active interference system mixes each of the plurality of photon beams comprising the scene with the corresponding source photon beam causing a reduction in a phase variance between the plurality of photon beams that is enhanced by the active interference system by the output signal comprising a predetermined gain.

14. A method, comprising:
receiving a plurality of photon beams through a synthetic optical aperture, the plurality of photon beams comprising a scene including an object;
interfering each of the plurality of photon beams from the synthetic optical aperture with a corresponding source photon beam of a plurality of source photon beams in an active optical interference system to form a plurality of enhanced interference beams, each of the plurality of enhanced interference beams comprising at least a predetermined increase in gain and phase variance with respect to other enhanced interference beams of the plurality of enhanced interference beams; and
forming an output signal based on the plurality of enhanced interference beams, wherein the output signal is configured for use in generating an image of the object.

15. The method of claim 14, wherein the synthetic optical aperture comprises a plurality of optical apertures distributed in a pattern.

16. The method of claim 15, further comprising measuring a relative phase between each of the plurality of photon beam received by each optical aperture of the plurality of optical apertures and the corresponding source photon beam for generating the image of the scene.

17. The method of claim 14, further comprising:
generating a plurality of source photons comprising a non-classical state; and
distributing the plurality of source photons as the plurality of source photon beams.

18. The method of claim 14, wherein interfering each of the plurality of photon beams and the corresponding source photon beams comprises:
receiving by a first optical amplifier of an active optical interference device at least one of the plurality photon beams and the corresponding source photon beam, the first optical amplifier generating at least a first interference beam and a second interference beam; and
combining by a second optical amplifier of the active optical interference device is at least the first interference beam and the second interference beam and generating at least a first enhanced interference beam and a second enhanced interference beam.

19. The method of claim 18, further comprising:
detecting by a first detector the first enhanced interference beam;
generating a first electrical signal corresponding to the first enhanced interference beam;
detect by a second detector the second enhanced interference beam;
generating a second electrical signal corresponding to the second enhanced interference beam; and
combining the first electrical signal and the second electrical signal with first and second electrical signals from other active optical interference devices of a plurality of active optical interference devices of the active optical interference system for use in generating a reconstructed image of the object.

20. The method of claim 18, further comprising controlling a number photons pumped into the first optical amplifier by an optical pump, a total number of photons at an output of the active optical interference device corresponds to a chosen number of photons pumped into the first optical amplifier and a phase shift of a pumped output photon beam from the first optical amplifier determines an amount of gain in the second optical amplifier.

21. The system of claim 1, wherein the synthetic optical aperture is configured to receive the plurality of received photon beams comprising the scene including the object, the scene including the object being in a far-field region.

22. The system of claim 21, wherein the far-filed region is greater than twice a baseline squared divided by a wavelength of photons in the photon beams from the scene, the baseline being a distance between each of a plurality of optical apertures of the synthetic optical aperture.

* * * * *